Dec. 17, 1946. C. M. VERHAGEN 2,412,787
JETTISONING MEANS FOR THE ESCAPE PANELS OF AIRCRAFT
Filed May 22, 1943 3 Sheets-Sheet 1
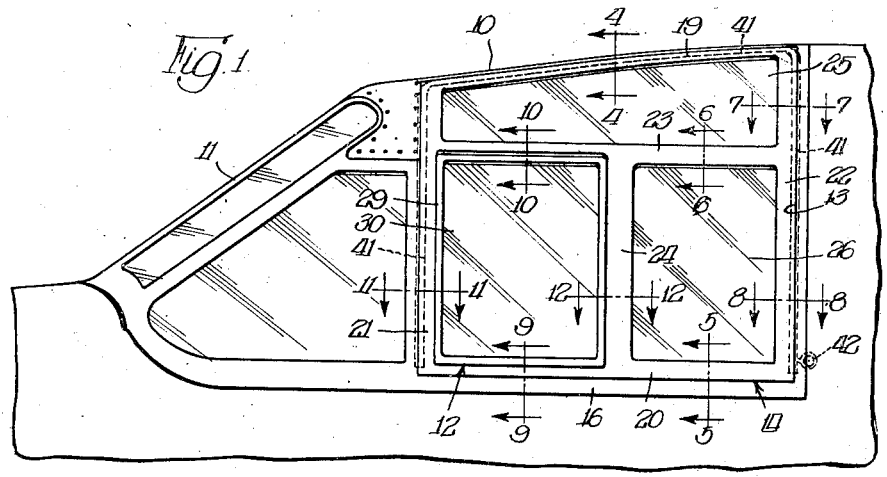
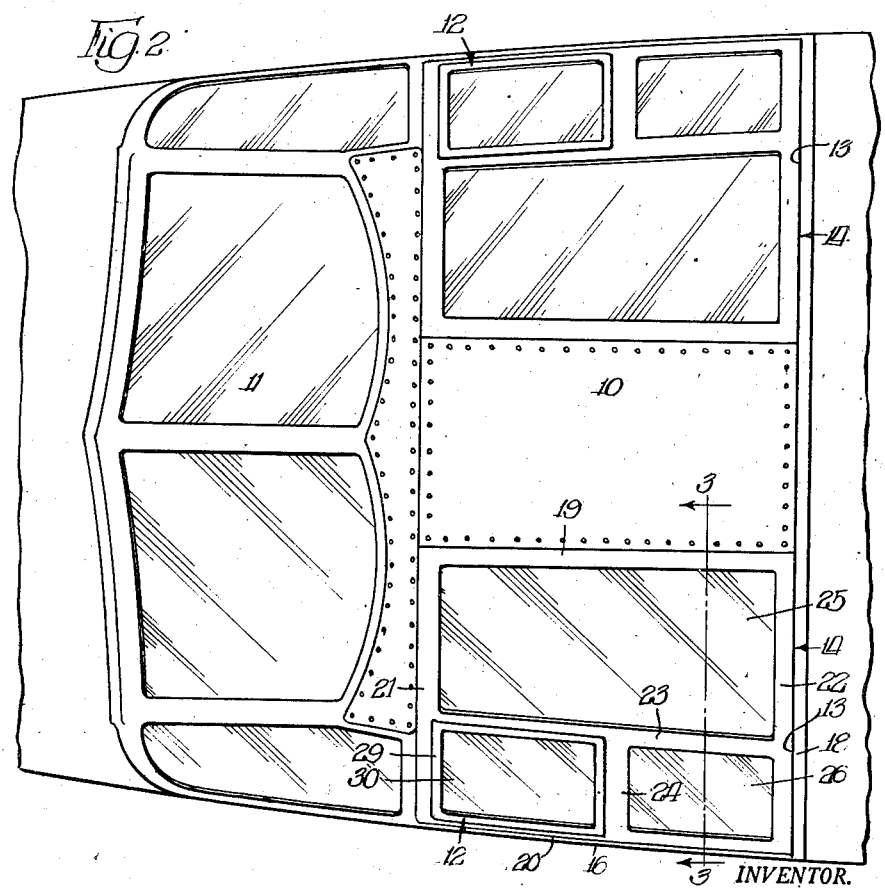
INVENTOR.
Christian M. Verhagen,
BY
Cromwell, Greist & Warden
ATTYS Dec. 17, 1946.  C. M. VERHAGEN  2,412,787
JETTISONING MEANS FOR THE ESCAPE PANELS OF AIRCRAFT
Filed May 22, 1943  3 Sheets-Sheet 2
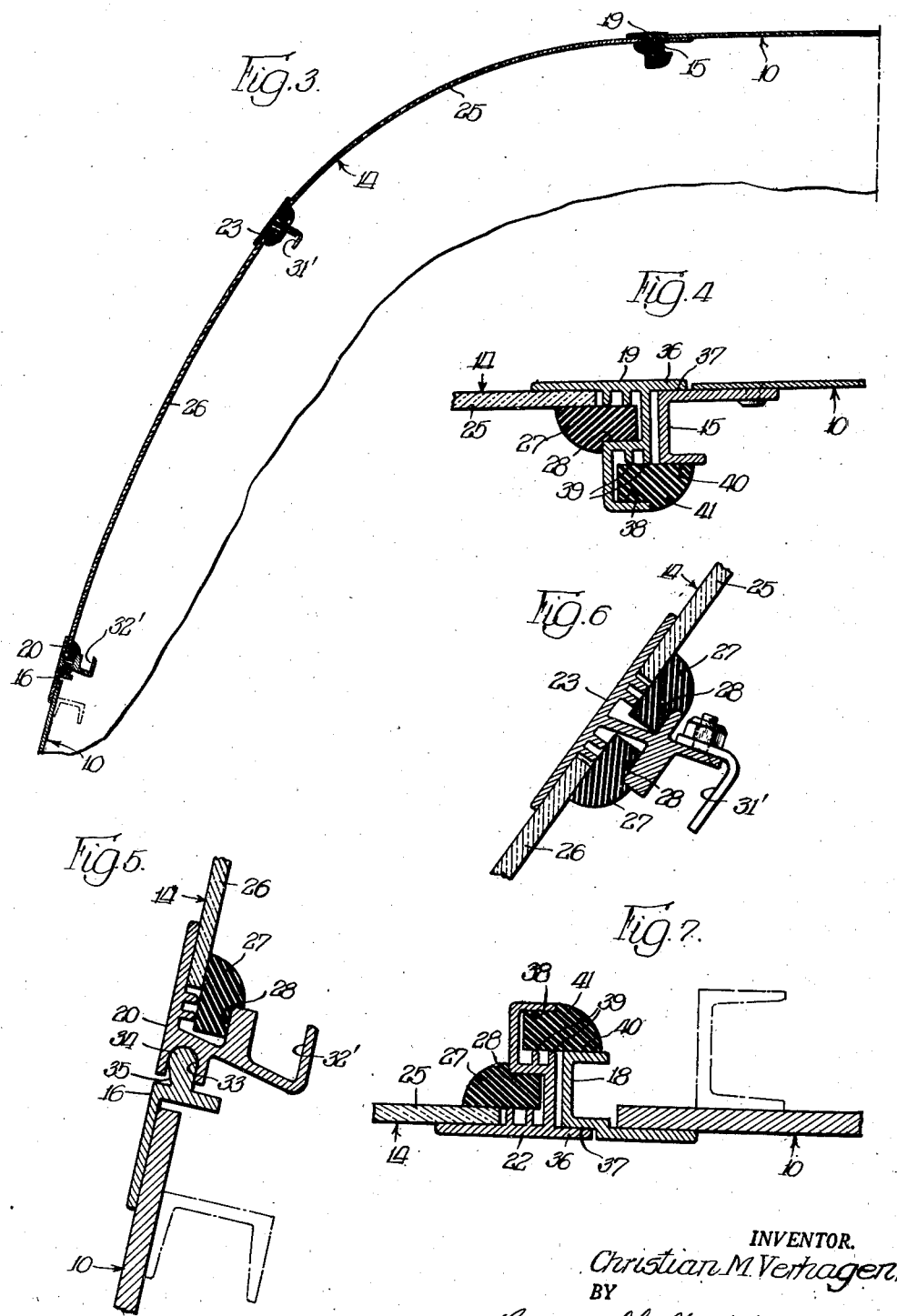
INVENTOR.
Christian M. Verhagen,
BY
Cromwell, Greist & Warden
attys.

Dec. 17, 1946.  C. M. VERHAGEN  2,412,787
JETTISONING MEANS FOR THE ESCAPE PANELS OF AIRCRAFT
Filed May 22, 1943  3 Sheets-Sheet 3
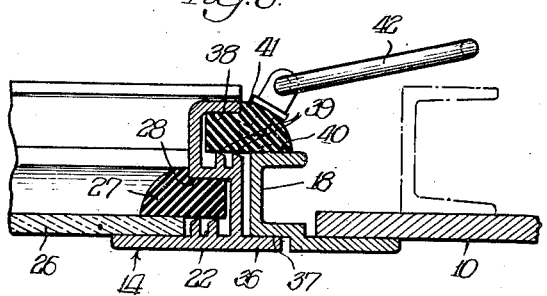
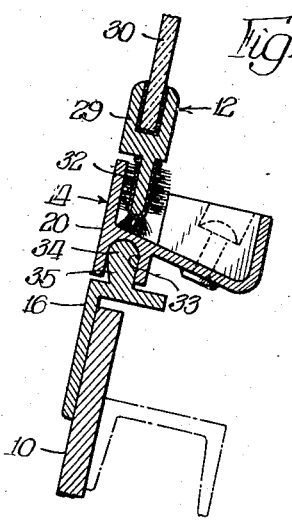
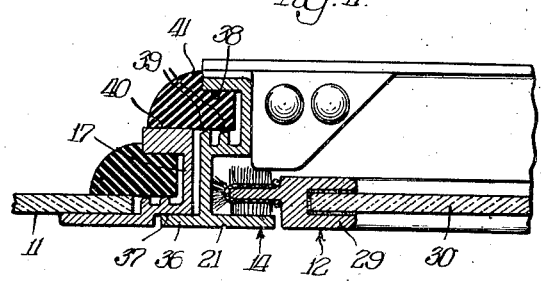
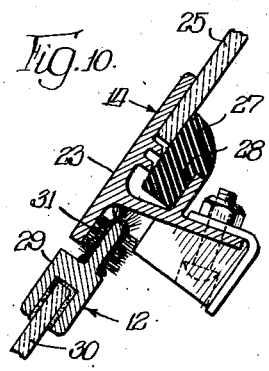
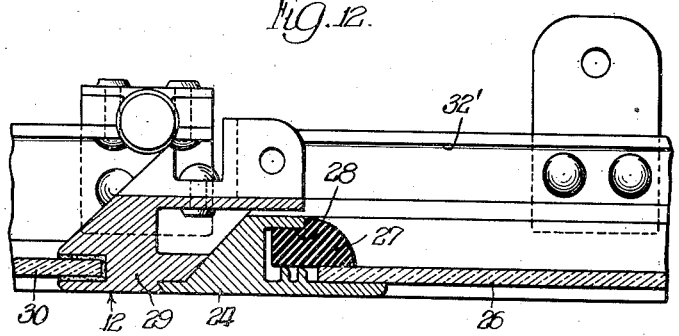
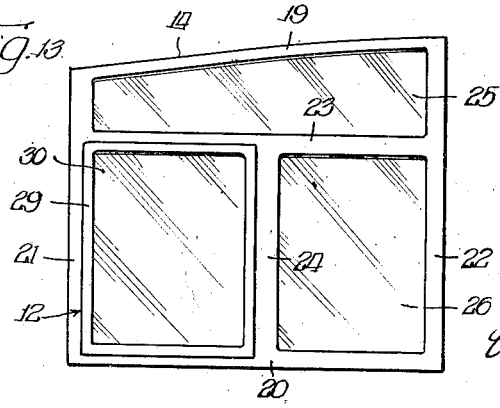
INVENTOR.
Christian M. Verhagen,
BY
Cromwell, Greist & Warden
ATTYS.

Patented Dec. 17, 1946

2,412,787

UNITED STATES PATENT OFFICE 2,412,787

JETTISONING MEANS FOR THE ESCAPE PANELS OF AIRCRAFT

Christian M. Verhagen, Elkhart, Ind., assignor to The Adlake Company, Chicago, Ill., a corporation of Illinois Application May 22, 1943, Serial No. 487,997

5 Claims. (Cl. 244—121)

This invention has to do with aircraft construction, and is particularly concerned with the problem of affording ready means of escape for the occupants from the pilot's compartment or other enclosure in the event it becomes necessary to get out quickly.

The purpose of the invention is to provide, in association with an escape panel, means for instantaneously jettisoning such panel, which means is simple, easy to operate and absolutely dependable, and serves normally to hold the panel securely in position.

Other more specific objects and advantages of the invention will be apparent to those skilled in the art upon a full understanding of the construction, arrangement and operation of the new panel jettisoning means.

While the invention is of particularly great value in connection with airplanes, gliders, dirigibles and other aircraft, because of the ever present possibility of the occupants having to bail out when in the air or having to avoid being trapped by fire when on the ground, it will be understood that the invention is also applicable in some measure to enclosures generally.

A preferred embodiment of the invention is presented herein by way of exemplification, but it will of course be appreciated that the invention is capable of incorporation in other structurally modified forms coming equally within the scope of the appended claims.

In the accompanying drawings:

Fig. 1 is a side view of a pilot's compartment, which compartment is provided at its opposite sides with two hatch-like openings which are normally closed by two escape panels equipped with the jettisoning means of the invention;

Fig. 2 is a top view of the pilot's compartment, showing both of the escape panels;

Fig. 3 is a vertical section through the port side of the compartment, at the location of the escape panel in that side, taken on the line 3—3 of Fig. 2;

Figs. 4, 5 and 6 are fragmentary vertical sections through the escape panel, corresponding respectively to the top, bottom and intermediate rail assembly sections shown in Fig. 3, taken respectively on the lines 4—4, 5—5 and 6—6 of Fig. 1;

Figs. 7 and 8 are fragmentary horizontal sections through the rear edge of the escape panel, taken respectively on the lines 7—7 and 8—8 of Fig. 1;

Figs. 9 and 10 are fragmentary vertical sections through respectively the lower and intermediate rail assemblies of the escape panel, at the location of the sliding window in the panel, taken respectively on the lines 9—9 and 10—10 of Fig. 1;

Fig. 11 is a fragmentary horizontal section through the front edge of the escape panel, at the location of the sliding window, taken on the line 11—11 of Fig. 1;

Fig. 12 is a fragmentary horizontal section through the intermediate vertical rail assembly in the panel, at the location of the sliding window, taken on the line 12—12 of Fig. 1;

Fig. 13 is a side view of the port escape panel, removed from the pilot's compartment; and Fig. 14 is a fragmentary perspective view of the locking strip used in holding the escape panel in position.

Referring in more detail to the drawings, it will be observed that the pilot's compartment of an airplane is shown somewhat fragmentarily at 10 in Figs. 1 and 2. This compartment—which is located immediately to the rear of the windshield 11—is glazed to afford good vision in several directions, and is closed except for small sliding windows 12 in the forward portions of its sides. The sides of the compartment are curved upwardly and inwardly, and are provided with escape hatches 13 of generally rectangular shape. The hatches 13 are normally closed by escape panels 14 of the same shape. The windows 12 are preferably but not necessarily located within the borders of the escape panels. While two escape panels are shown—one on the port side and the other on the starboard side—the present invention is not concerned with either the number or the locations of the panels. It has to do only with the means employed for mounting and releasing an escape panel, without regard to either its location or its shape. As both sides of the pilot's compartment are substantially identical, only the construction at the port side will be described.

The escape hatch 13 in the port side of the compartment is framed by an upwardly and rearwardly inclined top frame member 15 (Fig. 4), a horizontal bottom frame member 16 (Figs. 5 and 9), a vertical front frame member 17 (Fig. 11) and a vertical rear frame member 18 (Figs. 7 and 8). The front and rear frame members 17 and 18 are curved upwardly and inwardly in conformity with the curvature of the side of compartmnt at those stations. The four frame members 15, 16, 17 and 18, in addition to reinforcing the side of the compartment at the location of the hatch, provide locking formations for cooperation with the corresponding marginal portions of the panel 14.

The escape panel 14 includes an upwardly and rearwardly inclined top rail member 19 (Fig. 4), a horizontal bottom rail member 20 (Figs. 5 and 9), a vertical front rail member 21 (Fig. 11) and a vertical rear rail member 22 (Figs. 7 and 8). The front and rear rail members 21 and 22 are curved upwardly and inwardly in conformity with the curvature of the side of the compartment at those stations. The panel 14 also includes a horizontal muntin 23 (Figs. 6 and 10) intermediate the top and bottom rail members 19 and 20, and a vertical muntin 24 (Fig. 12) intermediate the front and rear rail members 21 and 22. The upper portion of the panel 14, above the horizontal muntin 23, and the rear half of the lower portion of the panel, are glazed respectively with transparent panes 25 and 26. The panes 25 and 26 are held in place by removable glazing strips 27 which fit into grooves 28 in the surrounding members.

The sliding window 12—which occupies the front half of the lower portion of the panel 14—consists of a sash 29, which sash is glazed with a transparent pane 30. The sash 29 is slidably mounted in vertically spaced guide channels 31 and 32 which are formed respectively on the horizontal muntin 23 (Fig. 10) of the panel and the bottom rail member 20 (Fig. 9) of the panel. The window 12 is adapted to be slid rearwardly from its normally closed position in the front half of the lower portion of the panel into an inwardly offset out-of-the-way position behind the pane 26 in the rear half of the lower portion of the panel, in which latter position it is supported in rearwardly extending continuations 31' and 32' of the guide channels 31 and 32. The construction and mounting of the window 12 have nothing to do with the jettisoning means which constitutes this invention, the provision of a window of any kind in the escape panel being entirely optional so far as the invention is concerned.

The panel 14 fits snugly within the hatch 13 in the side of the compartment, with the outer surface of the panel flush with the outer surface of the compartment. The bottom rail member 20 of the panel rests upon the bottom frame member 16 of the hatch and is provided on its under side with a shallow groove 33 (Figs. 5 and 9) which fits over a low rib 34 on the upper side of the frame member 16. The groove 33 and rib 34 are both curved in cross section, and the rib 34 is undercut at 35 on its outer face whereby to permit the upper edge of the panel to be swung into and out of position with the lower edge of the panel pivoting on the lower edge of the hatch.

The upper rail member 19 and the front and rear rail members 21 and 22 of the panel 14 are provided with flanges 36 (Figs. 4, 7, 8 and 11) which are disposed substantially flush with the outer face of the panel in overlapping engagement with the outer faces 37 of the corresponding frame members 15, 17 and 18 of the hatch 13. The rail members 19, 21 and 22 are provided, inwardly of the flanges 36, with set-back channels 38 which open toward the corresponding frame members. The channels 38 are provided on their outer sides with sharp jaw-like projections 39 which terminate substantially in line with the inner faces 40 of the frame members 15, 17 and 18. The channels 38 are connected together and extend about the front, top and rear margins of the panel 14 in the general form of an inverted U.

A locking strip 41 is positioned in the channels 38, with portions of the strip protruding from the channels into laterally compressed engagement with the inner faces 40 of the adjacent frame members of the hatch. This locking strip is preferably formed of rubber or other stiff flexible material. The strip 41, which is made slightly oversize, is inserted progressively under pressure into the channels 38, starting at either end of the strip. The compression of the material of the strip, with its tendency to expand against the jaw-like projections 39 in the channels, serves to prevent accidental displacement of the strip from the channels, and the resiliently compressed condition of the projecting portions of the strip serves to further insure against such displacement. The strip 41, when in its locking position in the channels 38 in the panel in laterally compressed engagement with the inner faces 40 of the frame members of the hatch, is subjected only to direct shearing stress at the junction between the panel and the hatch. The strip possesses ample strength and rigidity to withstand the peak shearing stress to which subjected in service. The strip is provided at one of its ends—preferably its rear end—with a pull handle 42 (Figs. 1 and 8). By pulling hard on this handle any person within the compartment can quickly remove the strip 41 from about the panel. As soon as the strip has been removed the panel will no longer have anything to hold it in place and will sail off into space, leaving the hatch open.

I claim:

1. An enclosure containing an escape opening, a panel normally closing the opening, said panel being provided exteriorly of the enclosure with marginal flanges which overlie the edges of the opening in the enclosure, and being provided interiorly of the enclosure with marginal grooves, and a locking strip of rubber-like material, removably positioned in the grooves, said strip protruding from the grooves into compressed lateral engagement with the inner faces of the enclosure adjacent the opening, and being manually removable from the inside of the panel, progressively along said edges, and said panel being free to move outwardly away from the enclosure upon the strip being removed, to provide a free and clear escape opening.

2. An enclosure containing an escape opening, a panel normally closing the opening, and having laterally extending portions engaging the outside of the enclosure, a strip of flexible material on the inside of the enclosure for locking the panel in position in the opening, said strip frictionally engaging portions of both the enclosure and the panel in interlocked association with the same and extending up one of the side edges of the panel, across the top edge, and down the other side edge, and a handle attached to the strip adjacent one of the ends of the latter for use in disengaging the strip progressively from its frictional engagement with the enclosure and the panel, whereby to unlock the panel and free it for outward movement away from the enclosure to provide a free and clear escape opening.

3. An enclosure containing an escape opening, a panel removably mounted in said opening, flanges on said panel engaging the outside faces of the enclosure adjacent the opening, a readily removable compressible strip frictionally secured to the inside of the panel and in compressed engagement with the inner faces of the enclosure adjacent the opening, said compressible strip being manually detachable from both the panel and the enclosure whereupon the panel is free to move outwardly away from the enclosure to provide a free and clear opening.

4. An enclosure containing an escape opening, a panel normally closing the opening, means on one edge of said panel forming a separable hinged connection with one edge of said enclosure, means on the remaining edges of said panel engaging the outside of the remaining edges of said enclosure which prevent the panel from moving inwardly of the enclosure, a marginal groove on the inside of said panel along said last mentioned edges, a flexible locking strip frictionally engaged in said groove and extending laterally into engagement with the inside edges of said enclosure to normally prevent the panel from moving outwardly of the enclosure, said flexible locking strip being manually removable from the inside of said enclosure whereby the panel will be free to pivot about one edge of the enclosure and fall outwardly from said opening.

5. An enclosure comprising a wall having an escape opening, a panel assembly for normally closing said opening removably mounted in said opening, said panel assembly having an inner side facing toward the inside of said enclosure, cooperating means on said panel assembly and said enclosure which permits removal of said panel assembly from said opening in a direction outwardly from said enclosure and prevents removal of the same in a direction inwardly into said enclosure, readily removable resilient means mounted on said inner side of said panel assembly and engaging adjacent portions of said enclosure for removably securing said panel assembly in said opening, said resilient means being manually detachable from the inside of said enclosure to free the panel assembly for movement in the opposite direction outwardly from said enclosure to provide a free and clear escape opening.

CHRISTIAN M. VERHAGEN.